United States Patent
Taylor et al.

(10) Patent No.: US 7,107,592 B2
(45) Date of Patent: Sep. 12, 2006

(54) METHOD, SYSTEM, AND PROGRAM FOR MAKING OBJECTS AVAILABLE FOR ACCESS TO A CLIENT OVER A NETWORK

(75) Inventors: Brandon E. Taylor, Longmont, CO (US); William H. Connor, Boulder, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 569 days.

(21) Appl. No.: 10/205,754

(22) Filed: Jul. 25, 2002

(65) Prior Publication Data

US 2004/0019596 A1 Jan. 29, 2004

(51) Int. Cl.
*G06F 9/46* (2006.01)
*G06F 15/16* (2006.01)
*G06F 12/00* (2006.01)

(52) U.S. Cl. ................ 718/104; 709/220; 707/204

(58) Field of Classification Search ........... 709/220; 707/204; 718/104
See application file for complete search history.

(56) References Cited

U.S. PATENT DOCUMENTS

| | | | |
|---|---|---|---|
| 5,974,549 A | 10/1999 | Golan | |
| 6,314,565 B1 | 11/2001 | Kenner et al. | |
| 6,473,800 B1 | 10/2002 | Jerger et al. | |
| 6,560,618 B1 * | 5/2003 | Ims | 707/204 |
| 6,567,918 B1 | 5/2003 | Flynn et al. | |
| 6,691,176 B1 | 2/2004 | Narin et al. | |
| 6,748,396 B1 * | 6/2004 | Klicnik et al. | 707/103 Y |
| 6,802,061 B1 | 10/2004 | Parthasarathy et al. | |
| 6,868,441 B1 * | 3/2005 | Greene et al. | 709/220 |
| 2004/0015953 A1 | 1/2004 | Vincent | |

OTHER PUBLICATIONS

Venners, Bill. "Chapter 1 of Inside the Java 2 Virtual Machine. Introduction to Java's Architecture," pp. 1-4 [online] [retrieved on Jul. 1, 2002] Retrieved from artima.com/insidejvm/ed2/cho1IntroToJavasArchitecture3.html.

Venners, Bill. "Chapter 8 of Inside the Java 2 Virtual Machine. The Linking Model. Part 17 of 20" pp. 1-4 [online] retrieved on Jul. 1, 2002 Retrieved from artima.com/insidejvm/ed2/cho8TheLinkingModel117.html.

Venners, Bill. "Chapter 8 of Inside the Java 2 Virtual Machine. The Linking Model. Part 3 of 20." pp. 1-2 [online] [retrieved on Jul. 1, 2002] Retrieved from artima.com/insidejvm/ed2/cho8TheLinkingModel117.html.

"Java.lang Class ClassLoader," pp. 1 of 17 [online] [retrieved on Jun. 12, 2002] Retrieved from java.sun.com/j2se/1.4/docs/api/java/lang/ClassLoader.html.

(Continued)

*Primary Examiner*—Meng-Al T. An
*Assistant Examiner*—Camquy Truong
(74) *Attorney, Agent, or Firm*—Finnegan, Henderson, Farabow, Garrett & Dunner, L.L.P.

(57) ABSTRACT

Provided are a method, system, and program for making resources available for access to a client. A list is provided indicating a plurality of resources to make available for access to clients over a network and the list is processed to determine resources. Attributes of the resources are determined and reference codes are generated for the determined resources based on the determined attributes. The reference codes are associated with the resources for which the codes were generated. In response to receiving a request to one reference code from the client, a determination is made from the resource associated with the requested reference code and returning the determined resource to the requesting client.

35 Claims, 10 Drawing Sheets

OTHER PUBLICATIONS

"Catalina Class Loader Hierarchy," pp. 1-3 [online] [retrieved on Jun. 12, 2002] Retrieved on .ingrid.org/jajakarta/tomcat/tomcat-4.0b5/src/catalina/docs/dev/classloaders.html.

"Weblogic Server Application Classloading," pp. 1-5 [online] [retrieved on Jun. 21, 2002] Retrieved from //edocs.bea.com/wls/docs70/programming/classloading.html.

"Jini Planet: Developing for Deployment," pp. 1-5 [online] [retrieved on Mar. 17, 2002] Retirved from .kedwards.com/jini/develop.html.

"Dynamic Code Downloading Using RMI (Using the java.rmi.server.codebase Property)," pp. 1-8 [online] [retrieved on Mar. 17, 2002] Retrieved from java.sun.com/j2se/1.3/docs/guide/rmi/codebase.html.

"Deploying EJBs in WebLogic Server," pp. 1-9 [online] [retrieved on Jun. 12, 2002] Retrieved from .weblogic.com/docs51/classdocs/API_ejb/EJB_deployover.html.

"JAR File Specficiation," pp. 1-13 [online] [retrieved on Mar. 17, 2002] Retrieved from .java.sun.com/j2se/1.3/docs/guide/jar/jar/html.

"Iplanet Application Server Developer's Guide: Appendix B Runtime Considerations," pp. 1-5 [online] [retrieved on Jun. 12, 2002] Retrieved from docs.iplanet.com/docs/manuals/ias/60/sp4/dg/jpgapxre.htm.

"Java's Garbage-Collected Heap," pp. 1-7 [online] [retrieved on Jun. 21, 2002] Retrieved from .javaworld.com/javaworld/jw-08-1996/jw-08-gc_p.html.

"Security and the Class Loader Architecture," pp. 1-7 [online] [retireved on Jun. 21, 2002] Retrieved from .javaworld.com/javaworld/jw-09-1997/jw-09-hood_p.html.

Liang, Sheng, G. Bracha. "Dynamic Class Loading in the Java® Virtual Machine," pp. 36-44 [online] [retrieved on Jun. 12, 2002]. Sun Microsystems, Inc.

"Jini-Users Archives—Oct. 2001 (#31)," pp. 1-2 [online] [retrieved on Jun. 14, 2002] Retrieved from //swjscmail1.java.sun.com/cgi-bin/wa?A2+ind0110&L=jini-users&P=R1651.

"TOC. Class Loading," pp. 1-2 [online] [retrieved on Jun. 21, 2002] Retrieved from .infosys.tuwien.ac.at/Teaching/Finished/MastersTheses/JSEF/node31.html.

"Java Remote Method Invocation: 3—RMI System Overview. 304 Dynamic Class Loading," pp. 1-2 [online] [retrieved on Mar. 17, 2002] Retrieved from .java.sun.com/j2se/1.3/docs/guide/rmi/spec/rmi-arch5.html.

"Java.rmi.server. Class RMIClassLoader," pp. 1-9 [online] [retrieved on May 19, 2002] Retrieved from .chalmers.se/Cs/GRundutb/Kurser/pfnht/del2/java2-1.4-beta2/docs/api/java/rmi/server/RMIC.

"Java Remote Method Invocation: 5—Server Interfaces. 506 The RMIClass Loader Class," pp. 1-2 [online] [retrieved on Apr. 29, 2002] Retrieved from /.java.sun.com/j2se/1.3/docs/guide/rmi/spec/rmi-server7.html.

IEEE Internet. "Mobile Code Security. Secure Java Class Loading," Nov.-Dec. 1998, pp. 56-61 [online] [retrieved on Jun. 21, 2002] Available from computer.org/internet.

IBM Corp. "Understanding the Java ClassLoader," pp. 1-18 [online] [retrieved on Jun. 12, 2002] Available from ibm.com/developerWorks.

* cited by examiner

```xml
<?xml version="1.0" encoding="UTF-8" ?>

<!DOCTYPE population [
   <!ELEMENT population (instance*)>
   <!ELEMENT instance (component, id, container, class, properties)>
   <!-- A component is identified by its public package and
   version with which it must be compatible. The version may be *
   to indicate any exceptable version. In either case, the highest
   suitable version will be used. -->

<!ELEMENT component EMPTY>
   <!ATTLIST component package CDATA #REQUIRED version CDATA
#REQUIRED>
   <!-- The id must be a 128 bit GUID in unsigned hexadecimal form -->
   <!ELEMENT id (#PCDATA)>
   <!-- The container name (plain, facility, activatable, ...) -->
   <!ELEMENT factory (#PCDATA)>
   <!-- The class from which to create the instance -->
   <!ELEMENT class (#PCDATA)>
   <!-- The properties to pass to the container factory method -->
   <!ELEMENT properties (keyvalue+)>
   <!ELEMENT keyvalue EMPTY>
   <!ATTLIST keyvalue key CDATA #REQUIRED value CDATA #REQUIRED>
]>

<population>
                                    372a
   <!-- Instance 1 -->
   <instance>
374a      <component package="com.sun.netstorage.mgmt.container"
376a      version="1.0"/>
          <id>d1692856fa1941d8bc84caea71f7dad6</id>
378a      <factory>pinned</factory>
380a      <class>com.sun.netstorage.mgmt.container.TestComponent</class>
382a      <properties>
              <keyvalue key="k1" value="v1"/>
              <keyvalue key="k2" value="v2"/>
              <keyvalue key="k3" value="v3"/>
          </properties>
   </instance>
                                    372b
   <!-- Instance 2 -->
   <instance>
374b      <component package="com.sun.netstorage.mgmt.container"
          version="1.0"/>
376b      <id>d1692856ea1931d8cc84daea71f7dad6</id>
378b      < factory >pinned</factory>
380b      <class>com.sun.netstorage.mgmt.container.TestComponent</class>
382b      <properties>
              <keyvalue key="k11" value="v11"/>
              <keyvalue key="k22" value="v22"/>
              <keyvalue key="k33" value="v33"/>
          </properties>
   </instance>

</population>
```

FIG. 8
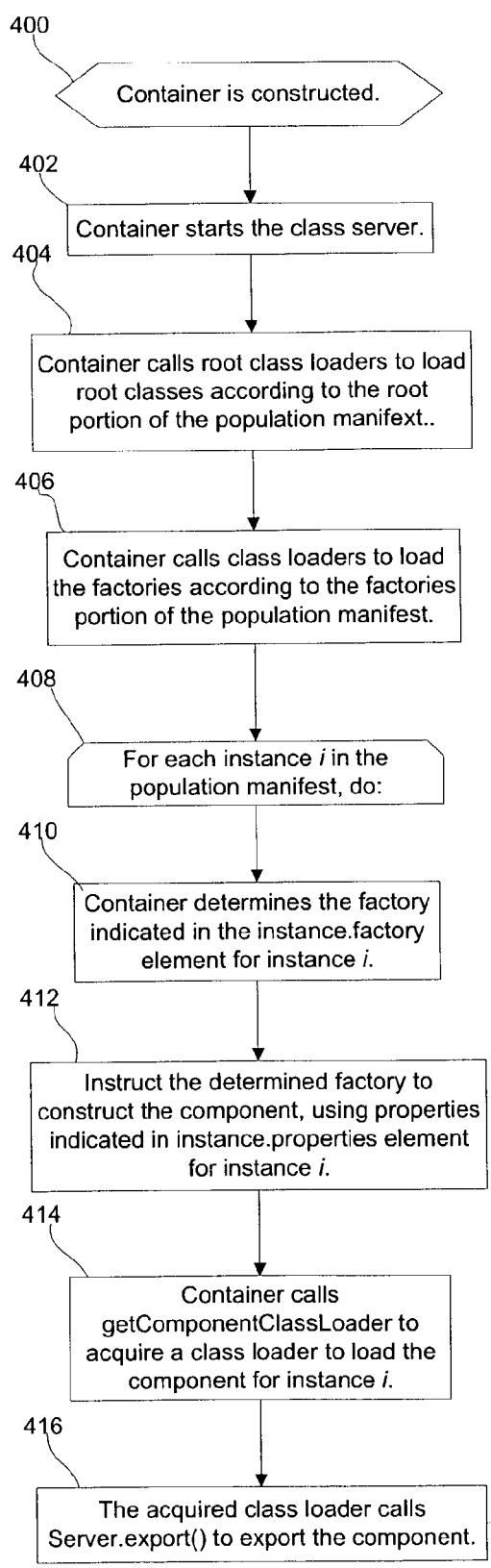
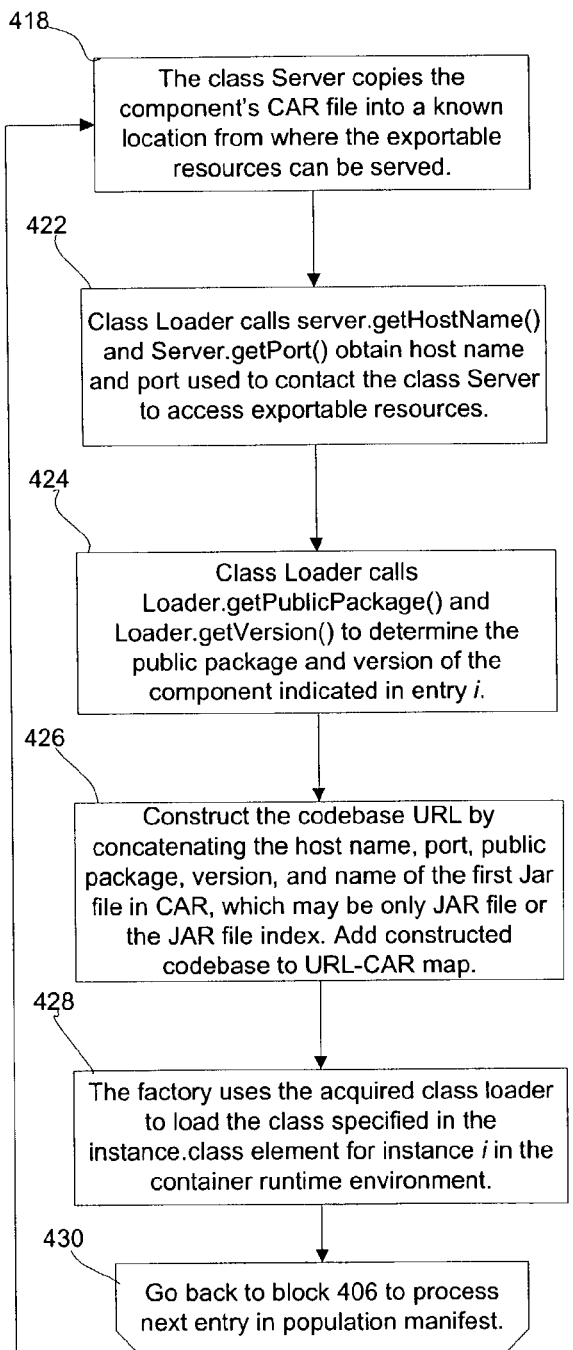

METHOD, SYSTEM, AND PROGRAM FOR MAKING OBJECTS AVAILABLE FOR ACCESS TO A CLIENT OVER A NETWORK

CROSS-REFERENCE TO RELATED APPLICATIONS

The following identified U.S. patent application is relied upon and is incorporated by reference in this application.

U.S. Patent application ser. No. 10/205,753, entitled "METHOD, SYSTEM, AND PROGRAM FOR LOADING PROGRAM COMPONENTS," filed Jul. 25, 2002.

BACKGROUND OF THE INVENTION

1. Field of the Invention

The present invention relates to a method, system, and program for making objects available for access to a client over a network.

2. Description of the Related Art

The Java** Remote Method Invocation (RMI) system, developed by Sun Microsystems, Inc., provides a framework in which objects on separate computers may communicate over a network. RMI is a Remote Procedure Call (RPC) mechanism that may be implemented using more than a single transport protocol. In the Java RMI framework, an object on a server is represented on a client system by a stub or proxy object. Applications running on the clients can call a local method on the proxy object that causes the corresponding method on the remote object to be invoked. When a proxy method is invoked, the proxy object communicates with the RMI runtime system on the server side and the proxy object communicates parameters to the remote object. The JVM including the remote object may lie on a remote system or the same system including the proxy object. The proxy object then receives the result of the method invocation and returns the value (if any) to the caller.

In distributed computing environments, services and clients running in different machines or address spaces may utilize RMI to allow clients to access remote services in another address space, such as a remote server. When accessing a remote service using RMI, the client may receive objects from the service (the service might also receive objects from the client), yet not have loaded the classes needed to manipulate the received objects. For instance, when the client receives return values (or exceptions), the client needs the class definitions for such received objects to use the data received from the remote server. The RMI specification provides for dynamic class loading (also known as network class loading or remote class loading) of the class definitions for the objects received from remote services that are not locally available at the client. This includes the dynamic downloading of remote classes needed by the client to use any object passed in RMI calls for which the class is not locally available. Once all necessary classes are downloaded from the remote address space, the client can then execute or otherwise manipulate objects returned by the remote service in response to the RMI call.

In the prior art, the client will download the classes in a file conforming to the Java Archive Format (JAR) file format or download the classes individually if they are not packaged in a JAR file, which is a file format based on the ZIP file format and is used to aggregate many files. JAR files are used to encapsulate multiple files into a single file that contain class files and other resources associated with a Java applet, application or component. The remote server would provide the client the classes needed for dynamic downloading in one or more JAR files.

The client invokes a class loader to download the class files the client needs, which may be packaged in JAR files, from an Hypertext Transfer Protocol (HTTP) server. A codebase is the location encoded as a URL from where the class loader downloads the needed class files. The codebase URL is associated with a serialized stream of bytes that indicates from where the class represented by those bytes can be loaded. Codebases are required for dynamic class loading to work. The process by which the client may download the bytecodes of classes to run programs not previously installed on the client is referred to as dynamic class loading. The process may begin with the client requesting a reference to a named remote object. Additionally, the reference may be provided to the client as the return value of a remote call or as a parameter of a callback method. An RMI registry returns a proxy to the remote object, also known as a stub or proxy object, to the requesting client. The proxy object may also be retrieved using mechanisms other than the RMI registry. In certain situations, if the client can locate the class definition for the stub instance in the client JVM CLASSPATH, then the client will load the class locally. If the client cannot load the class locally, then the client will request the class definition using the codebase, which is a URL annotated to the serialized bytestream representing the stub instance so that the client may dynamically download the class files, which may be included in a JAR file, that includes the classes the client needs to invoke remote methods on the remote object. Additionally, objects other than proxy objects might be received by a client and require class files that the client must dynamically download.

One complication in the above process is that the administrator must take certain actions to ensure that a URL is identified for each JAR that might need to be downloaded. In the prior art, this often requires the server administrator to explicitly specify the codebase (e.g., by setting a system property). This is often referred to as setting the codebase. The administrator may also register the remote object with an RMI registry. The codebase is annotated to the bytestream of the remote object when it is serialized for transport. This process to make a JAR file available to a client class loader using an HTTP server is the source of many problems in implementing a network system that makes use of RMI.

Accordingly, there is a need in the art to provide improved techniques for making programs and classes available to clients in a network.

SUMMARY OF THE EMBODIMENTS

Provided are a method, system, and program for making resources available for access to a client. A list is provided indicating a plurality of resources to make available for access to clients over a network and the list is processed to determine resources. Attributes of the resources are determined and reference codes are generated for the determined resources based on the determined attributes. The reference codes are associated with the resources for which the codes were generated. In response to receiving a request to one reference code from the client, a determination is made from the resource associated with the requested reference code and returning the determined resource to the requesting client.

In further implementations, the list indicates a hierarchical relationship of class loaders that load programs associated with the components.

In still further implementations, the attributes used to generate the reference codes may indicate a host and port at which the request for the reference code is received and a name and version of the objects. Further, the reference codes may comprise Universal Resource Locator (URL) addresses.

In further implementations, the resources are associated with classfiles, and the request is from a client employing dynamic class loading to download classfiles for objects passed from remote services that are not locally available at the client.

In yet further implementations, loading the resources associated with the list further comprises constructing a class loader for each resource indicated in the list; and calling each constructed class loader to load at least one resource for which the class loader is constructed.

Described implementations provide techniques to make resources available to clients by generating reference codes for the objects, such as URL addresses, that may be used to request the objects.

BRIEF DESCRIPTION OF THE DRAWINGS

Referring now to the drawings in which like reference numbers represent corresponding parts throughout:

FIG. 7 illustrates an example of an XML file providing information on components in accordance with certain implementations of the invention;

FIG. 8 illustrates logic to load archive files to make available for access to clients in accordance with certain implementations of the invention;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
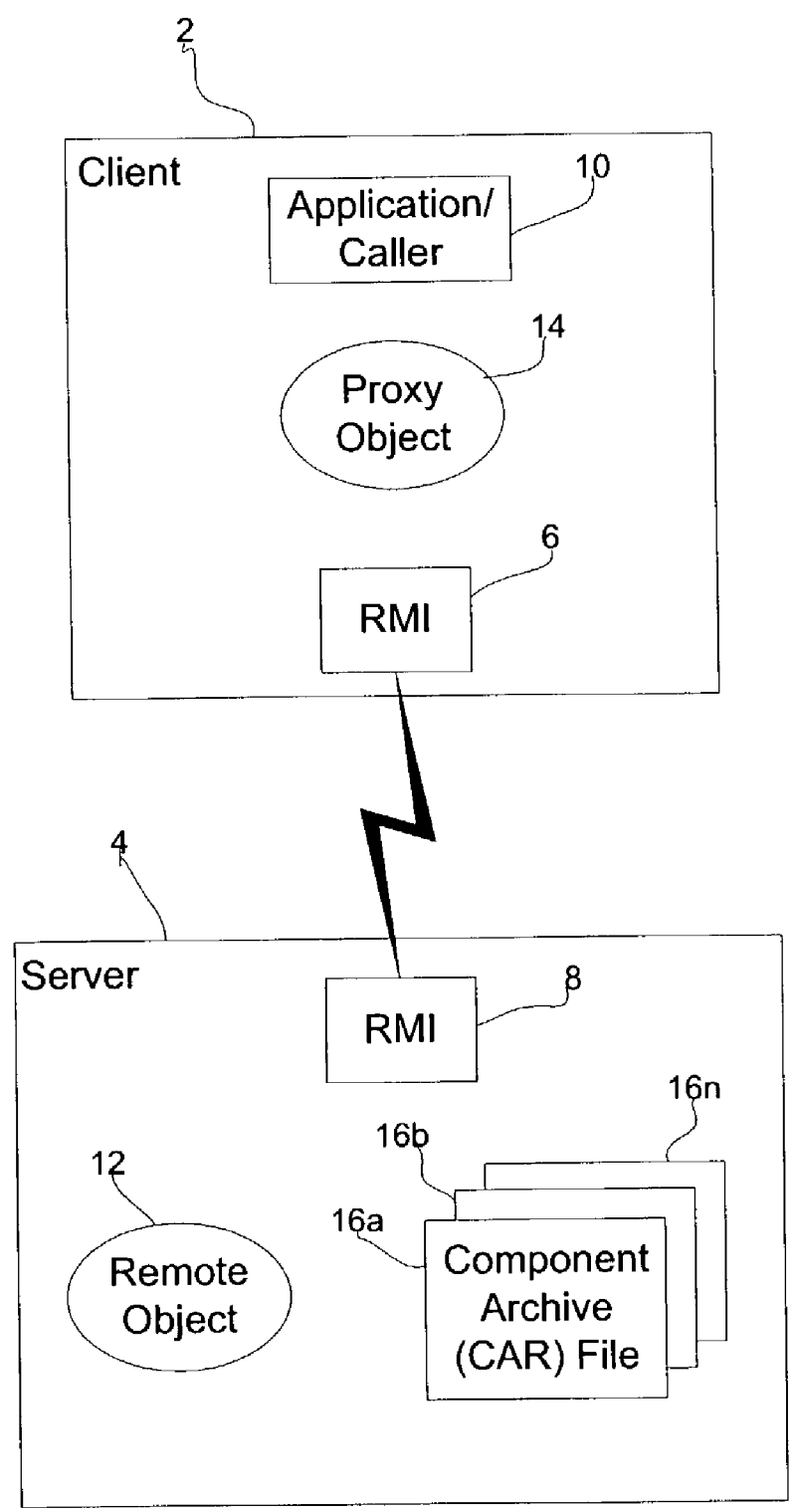
FIG. 1 illustrates computing environment in accordance with certain implementations of the invention.

FIG. 1 illustrates a computing environment in which aspects of the invention are implemented. A client 2 and server 4 communicate using Remote Method Invocation (RMI) via client-side 6 and server-side 8 RMI interfaces.

The client 2 and server 4 would implement a Java Virtual Machine (JVM) to execute Java programs in a Java Runtime Environment (JRE). RMI requires a JVM in both the client 2 and server 4. The client 2 and server 4 may be implemented in different computing machines and communicate over a network. Alternatively, the client 2 and server 4 may comprise processes in different address spaces or the same address space that execute in the same computing device and communicate using RMI. An application/caller 10 on the client 2 would comprise an application or process in the client 2 that invokes methods on a remote object 12. The application/caller 10 may comprise any application or process known in the art. To accomplish the remote invocation, the application/caller 10 would invoke the methods upon a local proxy object 14 representing the targeted remote object 12. The called proxy object 14 would, in turn, execute the method call via the RMI interface 6 to the target remote object 12 through the server-side RMI interface 8.

When returning components, such as objects, to the client 2 in response to an RMI call, the server 4 would code the returned component with information, known in the art as the codebase, informing the client 2 of where the class associated with the returned component may be accessed. Thus, the codebase contains information on the location of the exportable classes that are needed to use the returned component. Specifically, the codebase is a universal resource locator (URL) associated with a serialized stream of bytes returned in response to the client RMI call that indicates the location of where the class represented by those bytes can be downloaded. The client 2 would use the information in the codebase to download a file (or files) including the classfiles needed to process the returned object.

In certain implementations, the server 4 would maintain exportable classes in Component Archive (CAR) files 16a, 16b . . . 16n, which may also include domestic classes that are not needed by clients dynamically loading the exportable classes. A domestic resource is a resource associated with a component that should never be loaded over the network into a client address space. An exportable resource is a resource that may be network loaded when a client uses a component associated with the exportable class.

Archive File Storing Exportable and Domestic Classes

Figure 2:
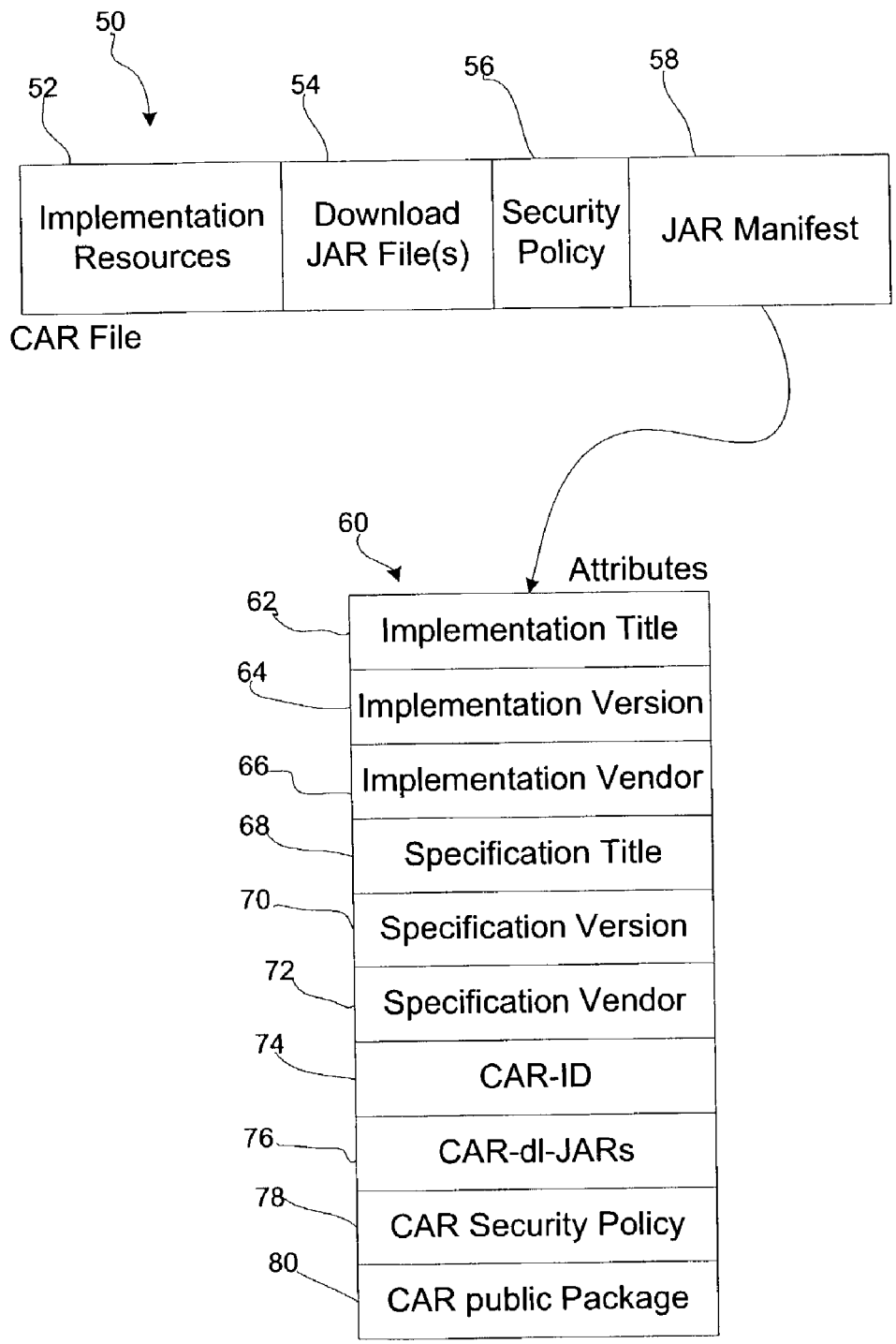
FIG. 2 illustrates a structure of a component archive file in accordance with certain implementations of the invention.

FIG. 2 illustrates one implementation of a structure 50 of a CAR file 16a, 16b . . . 16n that includes the exportable components the client 2 would need to use certain components returned from the server 4 in response to an RMI call. The CAR file structure 50 includes the following elements, implementation resources 52, a download JAR file(s) 54, a security policy 56, and a JAR manifest 58. The implementation resources 52 includes the resources, such as classes, that are needed to support the implementation of a component. In certain implementations, the implementation resources 52 would include domestic classes and other resources not needed by RMI clients, such as localization resources, property files, etc. Implementation resources may be maintained in the CAR structure 50 just as they are in a JAR file. Further details of the JAR file format are described in the Sun Microsystems, Inc. publication "Jar File Specification" (Copyright Sun Microsystems, 1999), which publication is incorporated herein by reference in its entirety.

Figure 3:
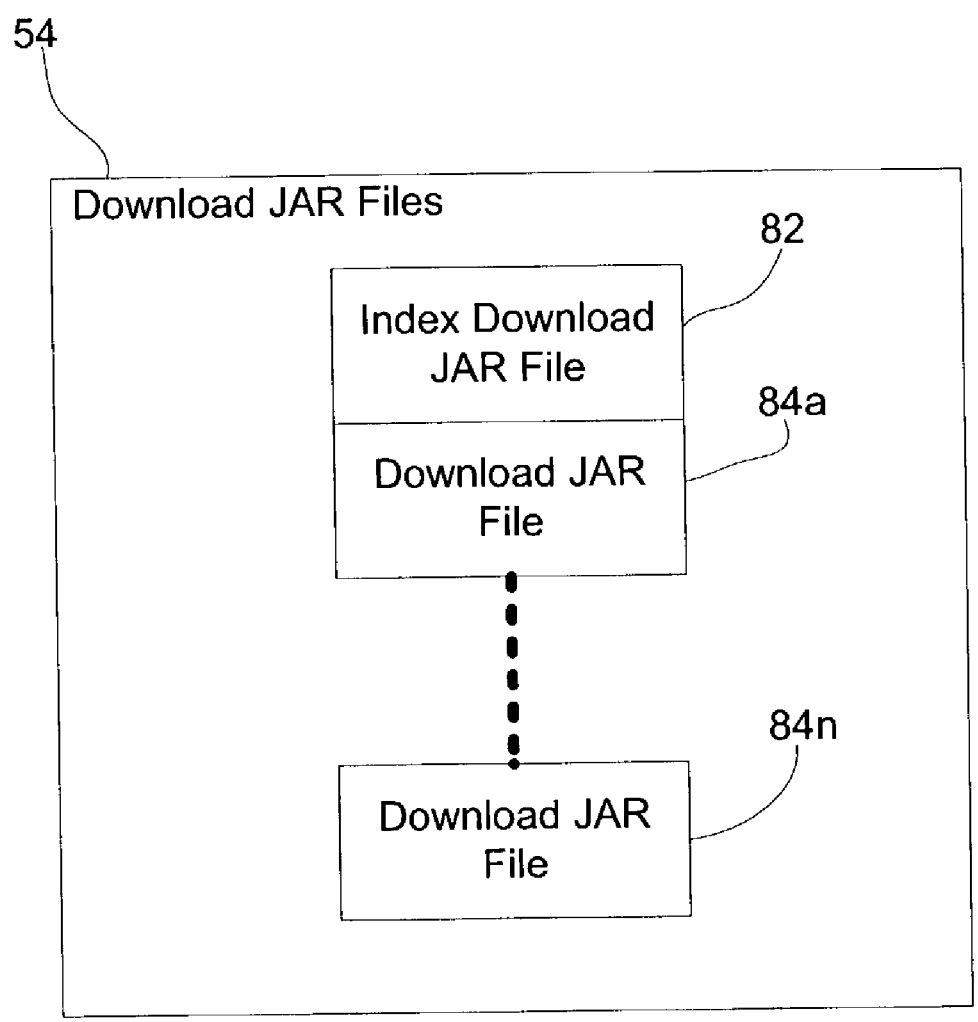
FIG. 3 illustrates further details of download archive files in the component archive file in accordance with certain implementations of the invention.

The download JAR file 54 contains the exportable classfiles and other requisite resources that may be network loaded by a client 2. A single CAR file 16a, 16b . . . 16n may include one or more download JAR files 54. If the CAR file 16a, 16b . . . 16n includes multiple download JAR files 54, then one JAR file may contain the index providing information on all the other download JAR files. FIG. 3 illustrates multiple download JAR files that may be included in field 54 of the CAR file 16a, 16b . . . 16n, where the JAR files include an index download JAR file 82 that references multiple download JAR files 84a . . . 84n, wherein the download JAR files 84a . . . 84n include exportable classfiles and resources that may be dynamically downloaded by a client 2, i.e., network loaded. Thus, field 54 may include a single JAR file or a JAR file comprising an index 82 referencing further JAR files 84a . . . 84n in the CAR file. In this way, the exportable classes are provided in a separately addressable section of the archive file so that the client 2 can only load exportable classfiles from the download JAR file 54 and not access the domestic classes maintained in the implementation resources 52. Each download JAR file would include meta information on the classes included in the download JAR file. In certain implementations, the download JAR files comprise well-formed JAR files, and include the attributes and meta information directory specified in the JAR file architecture. Further, the index JAR file 82 would include for each indexed JAR, metadata for the indexed JAR, including information on the classfiles included in the JAR file.

Further, if the CAR file 16a, 16b . . . 16n has multiple download JAR files 84a . . . 84n each having multiple files of related classfiles, then the client 2 may search the index of the download JAR file 82 to locate the download JAR file 84a . . . 84n having the classfiles the client needs. The client 2 would then only load the located download JAR files 84a . . . 84n including the needed classfiles 84a . . . 84n. With the described implementations, the client does not load domestic classes that are not needed to use the resources from the server 4.

The security policy 56 element provides a security policy associated with the implementation resources 52, such that any operation implemented within a domestic class loaded from the CAR file in the server's 4 JVM is restricted according to the specified security policy 56, i.e., restricted to the "sandbox" defined by the security policy. Thus, when a method is invoked from a domestic class loaded from the implementation resources 52, the server 4 would limit operations according to the defined security policy 56, e.g., do not perform read/writes to the host system, no network connection, etc. Any operation attempted outside of the defined security policy 56 would throw a security exception.

The CAR structure 50 further includes a well-formed JAR manifest 58 providing certain attributes of the CAR file. FIG. 2 illustrates attributes 60 that may be included in the JAR manifest 58 component of the CAR structure 50. Attributes in addition to those shown in FIG. 2 may be included in the JAR manifest 58, such as the attributes defined in the "JAR File Specification", incorporated herein by reference above. Following are attributes 60 that may be included in the JAR manifest 58. Attributes are defined for features of the component encapsulated by the CAR file.

Implementation Title 62: provides a string value that defines the title of the component implementation.
Implementation Version 64: A string value that defines the version of the component implementation.
Implementation Vendor 66: value is a string that defines the organization that maintains the component implementation.
Specification Title 68: a string value that defines the title of the component specification.
Specification Version 70: a string value defining the version of the component specification.
Specification Vendor 72: a string value defining an organization that maintains the component specification.
CAR-ID 74: unique identifier of the CAR.
CAR-dl-JARs 76: A list of the download JARs included in the CAR that include resources that may need to be network loaded. If the download JARs are indexed, then the download JAR referred to by the first file name 82 in the list contains the index for all the other download JAR files 84a . . . 84n (FIG. 3) in the CAR.
CAR Security Policy 78: file name representing the security policy file in the CAR that defines the "sandbox" or security restrictions on the execution of methods in the classes provided by the CAR.
CAR Public Package 80: Fully-qualified name of the packaged component's "public" package. This is the package that, along with the information (namely implementation version) that it provides, uniquely identifies the component.

Figure 4:
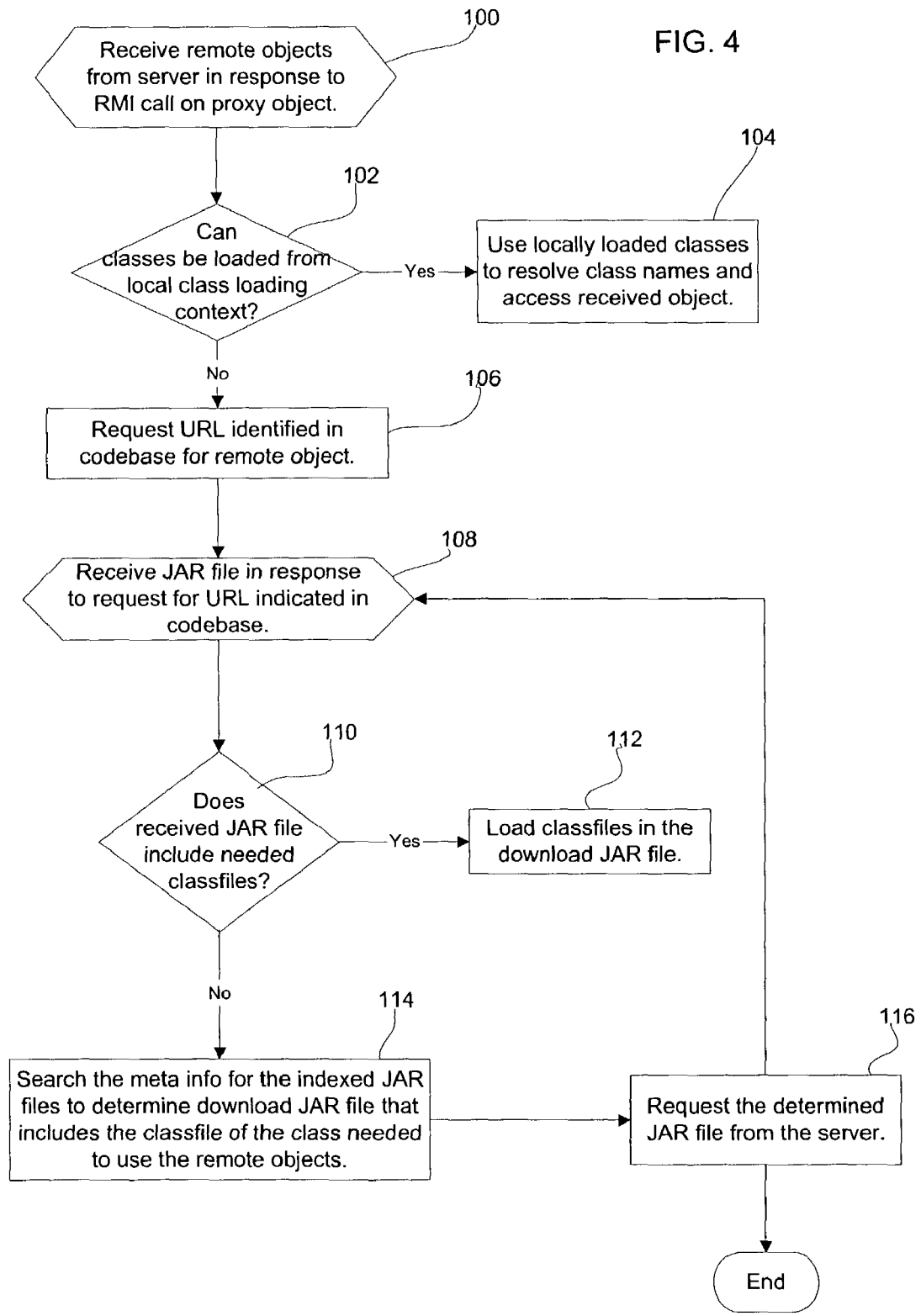
FIG. 4 illustrates logic to process the component archive file of FIG. 2 in accordance with certain implementations of the invention.

FIG. 4 illustrates logic implemented in classes and methods of the client-side RMI 6 to dynamically download exportable classes from the server 4 using the CAR file format 50. Control begins at block 100 with the client 2 receiving remote objects from the server 4 in response to an RMI call on the proxy object 14. If (at block 102) the client 2 can load the classes needed to use the object from the local class loading context, then the client 2 uses (at block 104) the locally loaded classes. Otherwise, if (at block 102) the classes cannot be loaded locally, then control proceeds to block 106 where the client 2 issues a request for the URL specified in the codebase for the remote object received from the server 4, such as a Hypertext Transfer Protocol (HTTP) request, in a manner known in the art. Upon receiving (at block 108) a JAR file for the codebase from the server 4, the client 2 then determines (at block 110) whether the received JAR file includes the needed classfiles. If the received JAR file includes the needed class files, then the client 2 loads (at block 112) the classfiles from the received JAR file. Otherwise, if the received JAR file contains an index 82, then the client 2 searches (at block 114) the metadata for the indexed JAR files 84a . . . 84n in the JAR index 82 to determine the JAR file including the needed classfiles. The client 2 then requests (at block 116) the determined indexed JAR file 84a . . . 84n from the server 4. In searching the meta data (at block 114) and requesting the indexed JAR file 84a . . . 84n including the needed class files, the client 2 may request from the codebase the JAR file including the needed class files, which may be indicated in the meta data included with the indexed JAR files 84a . . . 84n indicated in the JAR index 82.

The described implementations thus provide techniques to determine the exportable resources that need to be made available for download by the client when the archive file contains both domestic and exportable resources. Further, by allowing these exportable resources to be distributed within multiple download JAR files, the client may avoid loading classfiles that are not needed that are maintained in download JAR files that do not include the needed classfile(s). In this way, the client loads those classfiles that are needed and minimizes loading classfiles that are not needed.

Making Archive Files Available to Clients

Figure 5:
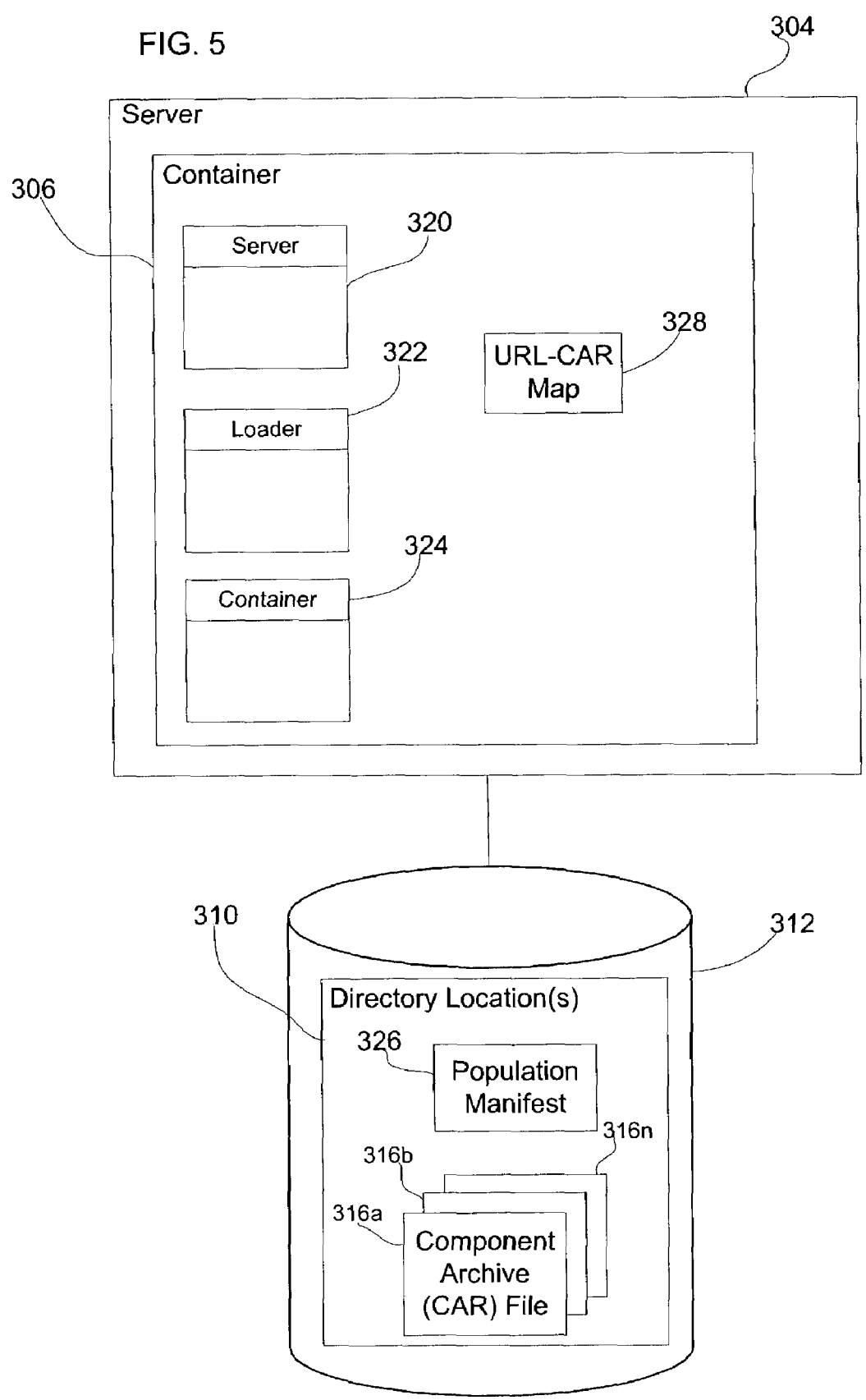
FIG. 5 illustrates a component architecture at the server in accordance with certain implementations of the invention.

FIG. 5 illustrates components in a server 304, which may comprise server 4 in FIG. 1 and all the components described therein including CAR files 316a, 316b . . . 316n, that are used to make archive files, such as JAR files, available to clients 2 requesting archive files through the codebase provided with an object. In FIG. 5, the CAR files 316a, 316b . . . 316n are placed into a file directory 310 in a storage device 312 coupled, either directly or indirectly, to the server 304. The server 304 provides a runtime environment in which the server 320, loader 322, and container 324 classes may execute to work together to automate the process of generating the codebase URLs and making archive files, and the exportable resources contained therein, available to requesting clients. The server 304 further maintains a population manifest 326 in the directory locations 310, which includes information on which components are loaded into the container 306, and the primary classfiles associated with each component. A URL-CAR map 328, which may be maintained by the class server 320, provides an association of a codebase URL with a CAR file, where a download JAR file encapsulated in the CAR file are returned in response to receipt of the URL/codebase requested by the client 2.

The population manifest 326 includes information on components to load in the container 306. An administrator would place the CAR files 316a, 316b . . . 316n into one or more file directories 310 in the storage device 312 and provide the population manifest 326 indicating the components that will be loaded. Once the container 306 is started, the classes 320, 322, and 324 are invoked to automatically generate the codebases that may be used to access the CAR files 316a, 316b . . . 316n and make the download JAR files 82, 84a . . . 84n (FIG. 3) encapsulated in the CAR files 316a, 316b . . . 316n available.

In certain implementations, the population manifest 326 indicates a hierarchy of class loaders to be employed in loading class files associated with components listed in the manifest. This hierarchy may comprise a delegation relationship between class loaders. Each instance of a class loader has an associated parent class loader. When called upon to find a class or resource, a class loader instance will delegate the search for the class or resource to its parent class loader before attempting to find the class or resource itself. Further details of class loading are described in the publication "Dynamic Class Loading in the Java™ Virtual Machine", by S. Liang and G. Bracha (Association of Computing Machinery, Proceedings of OOPSLA, 1998), which publication is incorporated herein by reference in its entirety.

Figure 6:
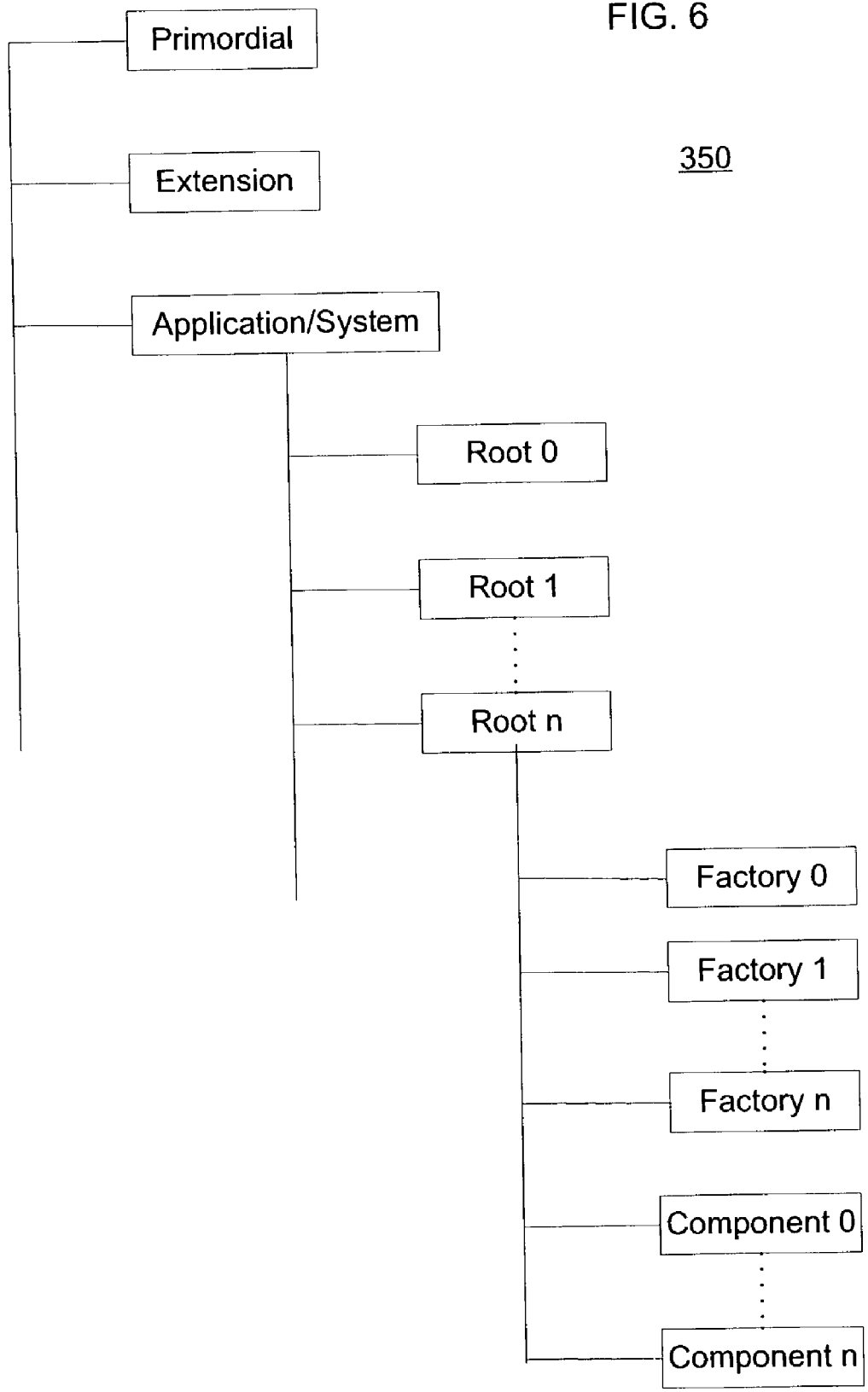
FIG. 6 illustrates an example of a class loader hierarchy in accordance with certain implementations of the invention.

The population manifest 326 is parsed by the container 306 to construct class loaders as necessary to load the components indicated in the manifests. FIG. 6 illustrates an example of a class loader hierarchy 350 that the population manifest 326 may implicitly define. The class loader hierarchy 350 divides class loaders into factory, root, and component class loaders. Component class loaders are used to load the variable components of the system, such as services, facility implementations, plug-ins, and dynamically loaded modules. Root class loaders load common interfaces that enable communication between the components of the system, such as facility interfaces. Factory class loaders are used to load factory classes. A factory is a component responsible for instantiating and destroying a particular type (or set of types) of components. A facility is a component whose instances can be shared across other components.

In certain implementations, the population manifest 326 may be implemented as multiple population manifests, where each manifest comprises an XML file. For instance, the population manifest may be implemented in three parts: one enumerating the "root" components ("root.xml"), one enumerating the factories ("factories.xml"), and one enumerating the components ("transient.xml"). The container parses the population manifest 326 parts and constructs class loaders as necessary to load the components indicated in the manifests. The "root chain" is built first, then the class loaders used to load the factories, and then the class loaders used to load the components. The "root chain" comprises root class loaders that load root classes, wherein root class loaders higher up in the "root chain" are provided the opportunity to load a class before root loaders that are lower in the root chain.

Each element in the one or more XML files forming the population manifest 326 indicates a component, encapsulated in a CAR file to be loaded, and the attributes of the element may include information about the component, such as public package, version, etc. During runtime, a new component may be added to the system by adding a new element to the XML file comprising a population manifest 326. A root XML file may maintain information on the root components that are loaded, where the last XML element in the root XML file would comprise the component that is loaded by the lowest root class loader in the hierarchy. Further, a factory XML file may be used to specify factory components to load. Further XML files may be used to provide information on other types of components that are loaded.

FIG. 7 illustrates an example of an XML file 370, such as the "transient.xml" file discussed above, whose elements indicate the components to load. This XML file indicates the non-root and non-factory components that will be hosted in the container 306, where the root and factory components may be described in other XML files, e.g., "root.xml" and "factories.xml". The file 370 has multiple instance elements 372a, 372b, where each instance element indicates an instance of a class to load (service instance, facility implementation, . . . ). When the container is started, each specified instance 372a, 372b is instantiated in the order the instance appears in the file 370. Each instance includes the following subelements or attributes:

component: specifies the component from which the instance class should be loaded. The component elements are shown as elements 374a and 374b for instances 372a and 372b in the example of FIG. 7.

id: Uniquely identifies the particular instance. The id elements are shown as elements 376a and 376b for instances 372a and 372b in the example of FIG. 7.

factory: The named factory used to create the instance. The factory name may be mapped to a factory using the factory manifest 326, e.g., "factories.xml". The factory elements are shown as elements 378a and 378b for instances 372a and 372b in the example of FIG. 7.

class: The class of the instance to be created. The class elements 380a and 380b for instances 372a and 372b in the example of FIG. 7.

properties A list of key value pairs to be passed to the factory to parameterize the instance. Some of these properties are intended for factory consumption and some for instance consumption. The mix and meaning of these properties is factory specific. The property elements are shown as elements 382a and 382b for instances 372a and 372b in the example of FIG. 7.

The Container class 324 may include the following functions:

getComponentClassLoader( ): this method is called to create a component class loader that will load the component identified by the package and version information for each component indicated in the population manifest 326.

getLowestRootClass loader( ): returns the lowest root class loader indicated in the class load hierarchy 350.

The Loader class 322 may include the following functions:

getExportURLs( ): generates the codebase, in URL form, that is used to fetch the download JAR or (JARs) encapsulating the resources exported by the component to the network.

getPublicPackage( ): returns the public package information for a component.

getVersion( ): returns the version of a component.

getPolicy( ): returns the security policy associated with a component.

The Server class 324 may include the following functions:

export( ): makes the exportable resources included in the JAR files that are themselves encapsulated in a CAR file available for download.

getHostName( ): returns the host name of the system on which the class server resides.

getPort( ): returns the port used to contact the class server.

FIG. 8 illustrates logic or operations implemented in interfaces of the container 306 and interfaces included in the Server 320, Loader 322, and Container 324 classes to make exportable resources of the components indicated in the provided population manifest 326 available to clients 2. Control begins at block 400 with the construction of the container 306. In response, the container 306 loads and starts (at block 402) the class server 320 and constructs and calls (at block 404) the root class loaders to load the root classes indicated in the root portion of the population manifest 326, which may comprise a separate root manifest, e.g., "root.xml". The container 306 further calls (at block 406) the factory class loaders to load the factory classes indicated in the factories portion of the population manifest 326, which may comprise a separate factory manifest, .e.g., "factories.xml". The container 306 further performs the loop at blocks 408 through 430 for each component instance i, e.g., population instances 374a, 374b (FIG. 7), indicated in the component portion of the population manifest, which may comprise one or more separate component files, e.g., "transient.xml", "persistent.xml", etc.

At block 410, the container 306 determines the factory indicated in the instance.factory element for instance i, e.g., such as the factory elements 378a and 378b for component instances 372a and 372b, respectively, in FIG. 7. The container 306 then instructs (at block 412) the determined factory to construct the component using the properties indicated in the instance.properties element for instance i, e.g., such as the instance elements 382a and 382b for component instances 372a and 372b, respectively, in FIG. 7.

The factory further calls (at block 414) the Container.getComponent-ClassLoader( ) method to acquire a class loader to load the classes associated with the component for instance i. The class loader to use may be determined by using the class hierarchy indicating the delegation model that is indicated in the population manifest 326. The aforementioned copending and commonly assigned patent application entitled "Method, System, and Program for Loading Program Components", provides techniques for determining a class loader to load a class. The acquired class loader then calls (at block 416) the Server.export( ) method to make the exportable resources of the component available for export. The class server 320 copies (at block 418) the CAR file 316a, 316b . . . 316n for the component into a known location from where the exportable resources can be served. The class server 320 may copy the entire CAR file or just the exportable JAR files therefrom.

The class loader further calls (at block 422) the Server.getHostName( ) and Server.getPort( ) methods to obtain the host and port used to contact the class server to access exportable resources. The class loader also calls (at block 424) the Loader.getPublicPackage( ) and Loader.getVersion( ) methods to determine the public package and version of the component for instance i. The class loader then constructs (at block 426) the codebase URL for the component i by concatenating the host name, port number, public package, version, and name of the first or only download JAR file in the CAR 316a, 316b . . . 316n, which may be the only download JAR file or a download JAR file including an index 82 (FIG. 3) for one or more download JAR files. The class server 320 further adds an entry to the URL-CAR map 328 to associate the location of the copied CAR file with the constructed codebase URL that will be used to access the exportable resources associated with the component i in the population manifest 326.

The result of this logic is that the URL-CAR map 328 is updated to associate the generated codebase with the location of the exportable resources for component i. The generated codebase may have the form of:

"protocol://host_name:port/public_package/version/name", where protocol is "http" or "https", depending on whether the class server 320 is secure, "host_name" and "port" are used to access the class server 320 using the aforementioned protocol, "public_package" is the dot (".") delimited public package of the exported CAR, "version" is the dot delimited version used to further qualify the public package, and "name" is the exportable resource name, such as the name of a download JAR file with or without a JAR index 82 (FIG. 3).

The factory then uses (at block 428) the acquired class loader to load the class specified in the instance.class element, e.g., elements 380a, 380b in FIG. 7, into the container 306. Control then proceeds (at block 430) back to block 408 to process any further component instances i in the population manifest 326.

The generated codebase URLs would then be annotated to objects instantiated from the classes encapsulated in the archive file, e.g., download JAR files, associated with the URLs so that the client can use the codebase to access the archive file including the class files the client needs.

Figure 9:
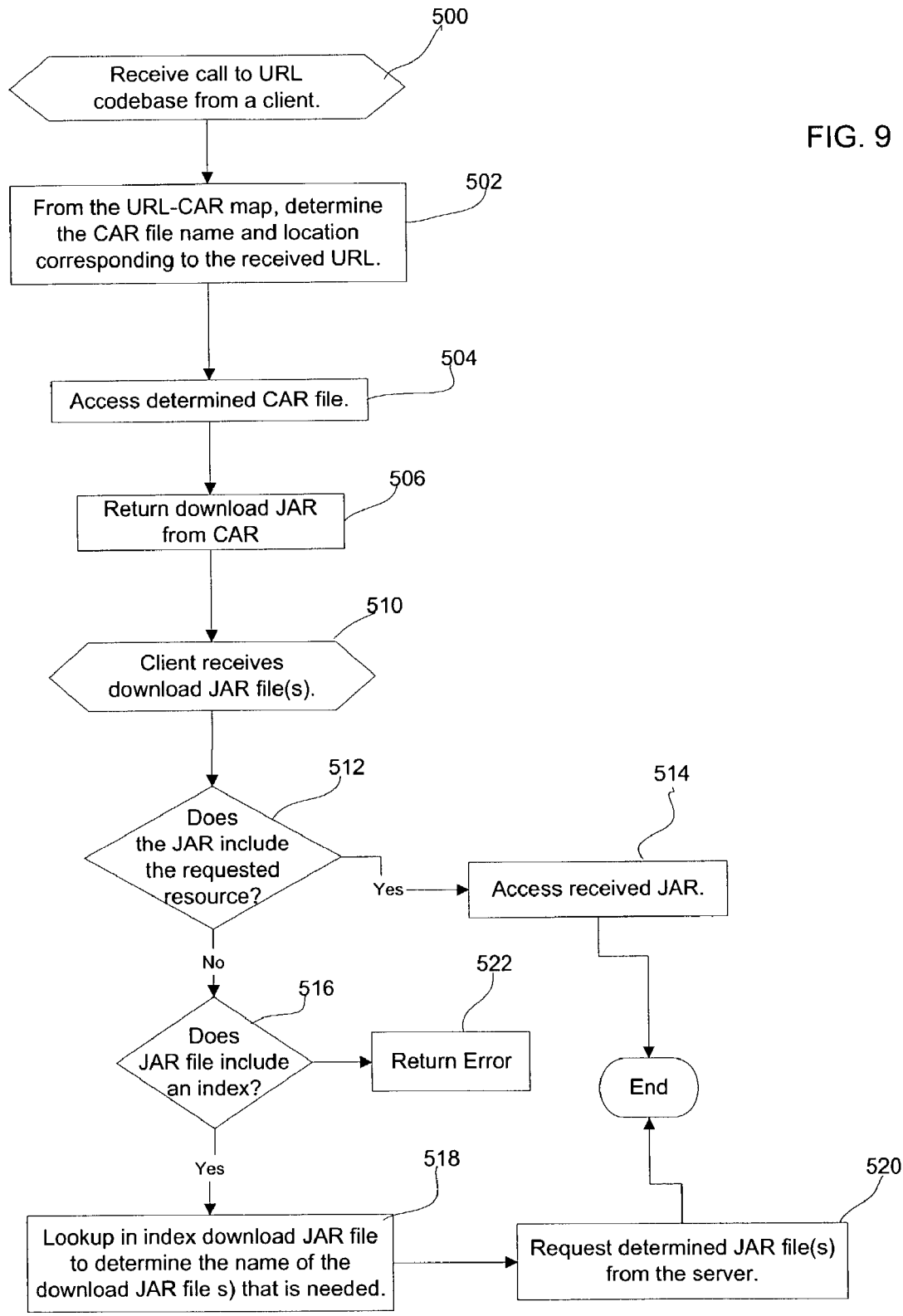
FIG. 9 illustrates logic to return requested files to client requests in accordance with certain implementations of the invention.

FIG. 9 illustrates logic implemented in the class server 320 to return the archive file associated with a codebase URL received from a client 2. Control begins at block 500 upon receiving a request from a client, of the codebase URL. The client 2 may make the call from over a network or from a different address space on the same machine. From the URL-CAR map 328, a determination is made (at block 502) of the CAR file 316a, 316b . . . 316n and location 310 (FIG. 5) corresponding to the received codebase URL. The determined CAR file 316a, 316b . . . 316n is accessed (at block 504). As discussed above, for CAR files, the download JAR file(s) 54 contain the exportable classfiles that the clients may need to process objects received from remote services. The server 4 then returns (at block 506) the first download JAR file, which may comprise a JAR file or a JAR file including the JAR file index 82 (FIG. 3) from the accessed CAR file.

At block 510, the client 2 receives the returned download JAR file. If (at block 512) the received download JAR includes the requested resource, then the client 2 accesses (at block 514) the download JAR to access the resource. Otherwise, if (at block 516) the download JAR file includes an index, then the client 2 uses (at block 518) the index to lookup and determine the JAR file including the needed exportable resources and requests (at block 520) the determined JAR file from the server 4. Otherwise, if the download JAR does not include the requested resource or an index to access such resource, then the client returns (at block 522) an error. In alternative implementations, the server 4 may return the entire CAR file, and then the client would access the JAR files therefrom.

The Loader.getExportURLs( ) method may be invoked when an object whose class was loaded by a component class loader is serialized for transport to a client 2. The result of the call is used by the RMI system to determine the codebase URL annotation for the bytestream representing the serialized object. In this way, the Loader.getExportURLs( ) method will return the codebase URL to annotate to the object being returned to the client 2 so that the client may request exportable classfiles if the client does not have the classfiles associated with the received object.

With the described implementations, the codebase URL is generated automatically based on a population manifest 326 supplied by the administrator and information in the CAR file and the local environment of the class server. Thus, the administrator does not have to manually generate the codebase URLs and make the archive files available at the separate URL locations. Instead, in certain implementations, the association of the generated codebase URL and the archive file is logical, so that the administrator does not assign the codebase URL or make the actual archive file available at the codebase URL location. With such implementations, the classes are automatically loaded and associated with the automatically generated codebase URL, thereby minimizing the set-up operations the administrator must perform and reducing the risk of mistakes or errors resulting from the administrator manually determining the URLs, which are comprised of a lengthy string of characters, and associating the URLs with appropriate archive files.

Additional Implementation Details

The above described method, apparatus or article of manufacture for providing access to network loaded classes may use standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments of the configuration discovery tool are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The described implementations provided a type of file that comprised a well formed JAR file that is used to distinguish exportable resources versus domestic resources. In alternative implementations, the archive file of the described implementations may conform to specifications other than the JAR file specification. Further, the techniques for distinguishing the exportable and domestic resources in the CAR file may be utilized to distinguish other types of resources, other than exportable and domestic resources as used in the RMI environment.

The described implementations utilized the Java programming language and the Java RMI communication protocol. Alternatively, the implementations may utilize other object oriented programming languages, such as C++, Smalltalk, etc. Further, the interface between the client and server may utilize alternative communication protocols to handle the remote calls, such as SOAP, Common Object Request Broker Architecture (CORBA), Remote Procedure Call (RPC), Distributed Relational Database Architecture (DRDA), etc. In implementations using alternative communication protocols for the remote communications, the client and server would implement the communication specific related methods.

FIGS. 4, 8, and 9 illustrate specific operations occurring in a particular order. In alternative implementations, certain of the logic operations may be performed in a different order, modified or removed and still implement preferred embodiments of the present invention. Moreover, steps may be added to the above described logic and still conform to the preferred embodiments. Further, operations described herein may occur sequentially or certain operations may be processed in parallel. Yet further, operations described herein may be performed by a single process and/or processing unit or distributed among a plurality of processes and/or processing units.

In the described implementations, the loader technique is used to load and make available classfiles providing classes and archive files that may include classfiles, such as a CAR file, JAR file, etc. In alternative implementations, the loader technique described herein may be used to make any type of file or object available for download, not just archive files or classfiles.

In the described implementations, a URL is generated for each component indicated in the population manifest 326. In alternative implementations, an alternative type of address or any other code may be generated to represent a file or object associated with the component entry to make available for download.

In the described implementations, the population manifest 326 comprised one or more XML files. Alternatively, the one or more files of the population manifest may be implemented in any file format, such as a text file, database object, spreadsheet, etc. Alternatively, the population manifest 326 may comprise any list or data structure indicating components to load.

In the described implementations, the components indicated in the population manifest and loaded in the container comprised class files. In alternative implementations, the loaded components may comprise any other type of data structure or program or object known in the art.

In the described implementations, the attributes for the archive files which are used to generate the URLs are accessed from the system and from the population manifest.

Additionally, the attributes may be accessed from metadata associated with the archive file, such as the JAR manifest 58 (FIG. 2).

The described implementations for loading components utilized specific classes and a container. In alternative implementations, different programming techniques and mechanisms may be used to make files needed by a client available over a network.

Figure 10:
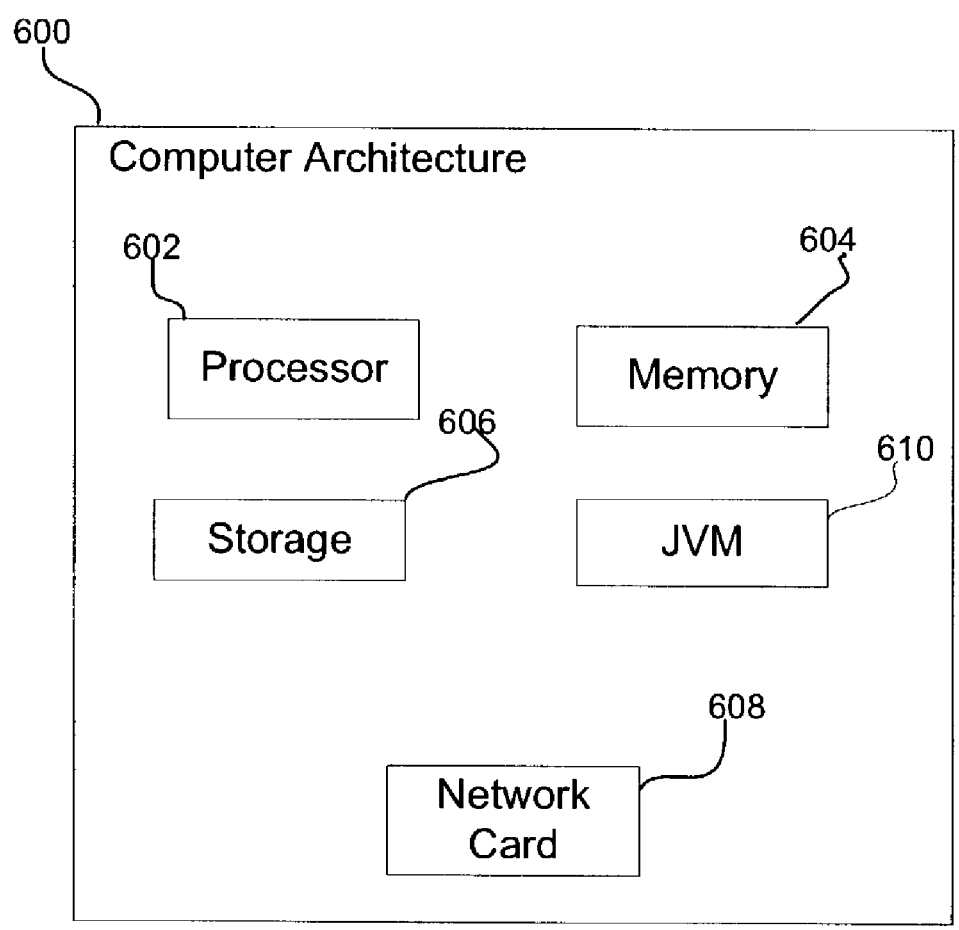
FIG. 10 illustrates a computer architecture in which aspects of the invention may be implemented.

FIG. 10 illustrates one implementation of the architecture of the client 2 and server 4, 304 (FIG. 5) when the client and server comprise separate computer systems These systems 2 and 4 may implement a computer architecture 600 having a processor 602 (e.g., a microprocessor), a memory 604 (e.g., a volatile memory device), and storage 606 (e.g., a non-volatile storage, such as magnetic disk drives, optical disk drives, a tape drive, etc.). The storage 606 may comprise an internal storage device or an attached or network accessible storage. Programs in the storage 606 are loaded into the memory 604 and executed by the processor 602 in a manner known in the art. The architecture further includes a network card 608 to enable communication with a network. Further, in certain implementations, the architecture may include a virtual machine program, such as the Java Virtual Machine (JVM) 610. In alternative implementations, the client 2 and server 4 may comprise processes in separate addresses spaces in a single computer The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for making resources available for access to a client, comprising:
   providing a list indicating a plurality of resources to make available for access to clients over a network,
   wherein the list indicates a hierarchical relationship of class loaders that load programs associated with the resources;
   wherein the resources include a plurality of fixed and variable resources, wherein the fixed resources include common interfaces that enable communication and the variable resources include interfaces needed to process specific objects; and
   wherein the class loaders that load the variable resources are at a lower order in the hierarchical relationship than the class loaders that load the fixed resources;
   processing the list to determine the resources;
   determining attributes of the resources;
   generating reference codes for the determined resources based on the determined attributes;
   associating the reference codes with the resources for which the codes were generated; and
   in response to receiving a request to one of the reference codes from the client, determining from the association the resource associated with the requested reference code and returning the determined resource to the requesting client.

2. The method of claim 1, wherein the list comprises an Extensible Markup Language (XML) file and each resource to make available for access comprises an XML element.

3. The method of 1, further comprising:
   adding information on a new variable resource and attributes thereof to the list during runtime.

4. The method of claim 1, wherein the resource comprises a set of one or more classes of computer programs the requesting client needs to process objects.

5. The method of claim 1, wherein the attributes used to generate the reference codes indicate a host and port at which the request for the reference code is received.

6. The method of claim 1, wherein the attributes used to generate the reference codes include a name and version of files including the resources.

7. The method of claim 1, wherein the reference codes comprise Universal Resource Locators (URL).

8. The method of claim 1, wherein the resources comprise class files encapsulated in an archive file including an index to a plurality of archive files including the class files.

9. The method of claim 8, wherein the archive file includes domestic classes that are note needed by the requesting clients and exportable classfiles that the request clients need to process objects.

10. The method of claim 1, wherein the resources are associated with classfiles, and wherein the request is from a client employing dynamic class loading to download classfiles for objects passed from remote services that are not locally available at the client.

11. The method of claim 1, wherein the client uses Remote Method Invocation (RMI) to communicate requests.

12. The method of claim 1, further comprising:
    loading the resources associated with the list into a runtime environment.

13. The method of claim 12, wherein loading the resources associated with the list further comprises:
    constructing a class loader for each resource indicated in the list; and
    calling each constructed class loader to load at least one resource for which the class loader is constructed.

14. The method of claim 1, further comprising:
    copying files implementing the resource to a location, wherein associating the reference codes with the resources further comprising associating the reference codes with the location of the files implementing the resources for which the reference codes were generated.

15. The method of claim 14, wherein returning the associated resource to the requesting client further comprises;
    returning an archive file included in the resource file at the location associated with the received reference code to the client.

16. A system for making resources available for access to a client, comprising:
    a storage;
    means for providing a list Indicating a plurality of resources in the storage to make available for access to clients over a network,
    wherein the list indicates a hierarchical relationship of class loaders that load programs associated with the resources;
    wherein the resources include a plurality of fixed and variable resources, wherein the fixed resources include common interfaces that enable communication and the variable resources include interfaces needed to process specific objects; and wherein the class loaders that load the variable resources are at a lower order in the hierarchical relationship than the class loaders that load the fixed resources;

means for processing the list to determine the resources;

means for determining attributes of the resources;

means for generating reference codes for the determined resources based on the determined attributes;

means for associating the reference codes with the resources for which the codes were generated; and means for receiving a request to one of the reference codes from the client and determining from the association the resource associated with the requested reference code and returning the determined resource to the requesting client.

17. The system of claim 16, wherein the attributes used to generate the reference codes indicate a host and port at which the request for the reference code is received.

18. The system of claim 16, wherein the resources comprise class flies encapsulated in an archive file including an index to a plurality of archive files including the class files.

19. The system of claim 18, wherein the archive file includes domestic classes that are not needed by the requesting clients and exportable classfiles that the request clients need to process objects.

20. The system of claim 16, further comprising:

means for copying files implementing the resource to a location in the storage, wherein associating the reference codes with the resources further comprising associating the reference codes with the location of the files implementing the resources for which the reference codes were generated.

21. A computer-readable medium containing instructions for performing a method for making resources available for access to a client, the method comprising:

providing a list indicating a plurality of resources to make available for access to clients over a network, wherein the list indicates a hierarchical relationship of class loaders that load programs associated with the resources;

wherein the resources include a plurality of fixed and variable resources, wherein the fixed resources include common interfaces that enable communication and the variable resources include interfaces needed to process specific objects; and wherein the class loaders that load the variable resources are at a lower order in the hierarchical relationship than the class loaders that load the fixed resources;

processing the list to determine the resources;

determining attributes of the resources;

generating reference codes for the determined resources based on the determined attributes;

associating the reference codes with the resources for which the codes were generated; and in response to receiving a request to one of the reference codes from the client, determining from the association the resource associated with the requested reference code and returning the determined resource to the requesting client.

22. The computer-readable medium of claim 21, wherein the list comprises an Extensible Markup Language (XML) file and each resource to make available for access comprises an XML element.

23. The computer-readable medium of claim 21, further comprising:

adding information on a new variable resource and attributes thereof to the list during runtime.

24. The computer-readable medium of claim 21, wherein the resource comprises a set of one or more classes of computer programs the requesting client needs to process objects.

25. The computer-readable medium of claim 21, wherein the attributes used to generate the reference codes indicate a host and port at which the request for the reference code is received.

26. The computer-readable medium of claim 21, wherein the attributes used to generate the reference codes include a name and version of files including the resources.

27. The computer-readable medium of claim 21, wherein the reference codes comprise Universal Resource Locators (URL).

28. The computer-readable medium of claim 21, wherein the resources comprise class files encapsulated in an archive file including an index to a plurality of archive files including the class files.

29. The computer-readable medium of claim 28, wherein the archive files includes domestic classes that are not needed by the requesting clients and exportable classfiles that the request clients need to process objects.

30. The computer-readable medium of claim 21, wherein the resources are associated with clasafiles, and wherein the request is from a client employing dynamic class loading to download classfiles for objects passed from remote services that are not locally available to the client.

31. The computer-readable medium of claim 21, wherein the client uses Remote Method Invocation (RMI) to communicate requests.

32. The computer-readable medium of claim 21, further comprising:

loading the resources associated with the list into a runtime environment.

33. The computer-readable medium of claim 31, wherein loading the resources associated with the list further comprises:

constructing a class loader for each resource indicated in the list; and calling each constructed class loader to load at least one resource for which the class loader ins constructed.

34. The computer-readable medium of claim 21, further comprising:

copying files implementing the resource to a location, wherein associating the reference codes with the resources further comprising associating the reference codes with the location of the files implementing the resources for which the reference codes were generated.

35. The computer-readable medium of claim 34, wherein returning the associated resource to the requesting client further comprises:

returning an archive file included in the resource file at the location associated with the received reference code to the client.

* * * * *

UNITED STATES PATENT AND TRADEMARK OFFICE
CERTIFICATE OF CORRECTION

PATENT NO. : 7,107,592 B2 Page 1 of 1
APPLICATION NO. : 10/205754
DATED : September 12, 2006
INVENTOR(S) : Brandon E. Taylor et al.

It is certified that error appears in the above-identified patent and that said Letters Patent is hereby corrected as shown below:

In claim 9, column 14, line 22, "note" should read --not--.

In claim 9, column 14, line 23, "request" should read --requesting--.

In claim 15, column 14, line 50, "comprises;" should read --comprises:--.

In claim 16, column 14, line 57, "Indicating" should read --indicating--.

In claim 18, column 15, line 20, "flies" should read --files--.

In claim 19, column 15, line 24, "request" should read --requesting--.

In claim 29, column 16, line 25, "files" should read --file--.

In claim 29, column 16, line 27, "request" should read --requesting--.

In claim 30, column 16, line 29, "clasafiles," should read --classfiles,--.

In claim 33, column 16, line 47, "ins" should read --is--.

Signed and Sealed this

Twelfth Day of December, 2006

JON W. DUDAS
*Director of the United States Patent and Trademark Office*